US007633744B2

(12) United States Patent
Kuhn

(10) Patent No.: US 7,633,744 B2
(45) Date of Patent: Dec. 15, 2009

(54) NOTEBOOK COMPUTERS CONFIGURED TO PROVIDE ENHANCED DISPLAY FEATURES FOR A USER

(75) Inventor: Benjamin J. Kuhn, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 283 days.

(21) Appl. No.: 11/140,849

(22) Filed: May 31, 2005

(65) Prior Publication Data

US 2006/0268500 A1    Nov. 30, 2006

(51) Int. Cl.
H05K 5/00 (2006.01)
H05K 7/00 (2006.01)
G06F 1/16 (2006.01)
G06F 1/20 (2006.01)

(52) U.S. Cl. .............. 361/679.04; 361/679.27; 361/679.55; 361/679.06; 361/679.26; 361/679.21; 248/919; 248/920

(58) Field of Classification Search ......... 361/683, 361/679, 686, 681, 679.04, 679.06, 679.26, 361/679.27, 679.21, 679.55; 248/917–923; 345/168, 169, 905; 364/708.1
See application file for complete search history.

(56) References Cited

U.S. PATENT DOCUMENTS

| | | | | |
|---|---|---|---|---|
| 5,128,662 A | * | 7/1992 | Failla | ............ 345/1.3 |
| 5,410,497 A | | 4/1995 | Viletto | |
| 5,590,021 A | * | 12/1996 | Register | ........ 361/681 |
| 5,673,170 A | | 9/1997 | Register | |
| 5,687,939 A | | 11/1997 | Moscovitch | |
| 5,768,096 A | | 6/1998 | Williams et al. | |
| 5,796,577 A | | 8/1998 | Ouchi et al. | |
| 5,900,848 A | | 5/1999 | Haneda et al. | |
| 6,094,341 A | | 7/2000 | Lin | |
| 6,151,401 A | * | 11/2000 | Annaratone | .......... 381/388 |
| RE36,978 E | * | 12/2000 | Moscovitch | ......... 248/122.1 |
| 6,222,507 B1 | * | 4/2001 | Gouko | .............. 345/1.1 |
| 6,266,241 B1 | | 7/2001 | Van Brocklin et al. | |
| 6,295,038 B1 | * | 9/2001 | Rebeske | ............ 345/1.1 |
| 6,302,612 B1 | * | 10/2001 | Fowler et al. | ............ 403/76 |
| 6,487,068 B1 | * | 11/2002 | Rahemtulla | .......... 361/681 |
| 6,525,750 B1 | * | 2/2003 | Knox | ............... 345/30 |
| 6,532,146 B1 | * | 3/2003 | Duquette | ............ 361/681 |
| 6,643,124 B1 | * | 11/2003 | Wilk | ............... 361/681 |
| 6,667,877 B2 | * | 12/2003 | Duquette | ............ 361/681 |
| 6,667,878 B2 | | 12/2003 | Ponx | |
| 6,762,929 B2 | * | 7/2004 | Sawyer | ............. 361/681 |

(Continued)

*Primary Examiner*—Jayprakash N Gandhi
*Assistant Examiner*—Bradley H Thomas
(74) *Attorney, Agent, or Firm*—Lee & Hayes, PLLC

(57) ABSTRACT

Systems and methods relating to notebook computers providing enhanced display features are described. In one instance, an exemplary notebook computer includes a housing. The housing includes a base that has a keyboard positioned on the base. The housing also includes a lid attached to the base via a hinge means and configured to swing from a transport-position against the keyboard to a user-position away from the keyboard. The notebook computer also includes a first display device positioned on the lid and generally opposing the keyboard. The notebook computer further includes a second optionally-deployable display device attached to the notebook computer and configured to deploy from a first storage-position to a second user-position in which the second optionally-deployable display device is configured to collectively create a user workspace with the first display device for a user positioned in front of the keyboard and generally opposite the hinge means.

6 Claims, 14 Drawing Sheets

U.S. PATENT DOCUMENTS

| | | | |
|---|---|---|---|
| 6,771,232 B2 * | 8/2004 | Fujieda et al. | 345/30 |
| 6,778,383 B2 * | 8/2004 | Ho | 361/681 |
| 6,794,798 B2 * | 9/2004 | Watanabe et al. | 310/334 |
| 7,050,835 B2 * | 5/2006 | Hack et al. | 455/566 |
| 7,061,472 B1 * | 6/2006 | Schweizer et al. | 345/168 |
| 7,136,282 B1 * | 11/2006 | Rebeske | 361/683 |
| 7,230,599 B2 * | 6/2007 | Wu et al. | 345/87 |
| 7,283,353 B1 * | 10/2007 | Jordan et al. | 361/681 |
| 2002/0071246 A1 * | 6/2002 | Stewart | 361/681 |
| 2003/0165048 A1 * | 9/2003 | Bamji et al. | 361/681 |
| 2003/0218577 A1 * | 11/2003 | Wang | 345/1.3 |
| 2004/0042163 A1 * | 3/2004 | Tutikawa | 361/683 |
| 2004/0228081 A1 * | 11/2004 | Lee | 361/683 |
| 2005/0063149 A1 * | 3/2005 | Shimamoto et al. | 361/683 |
| 2006/0082518 A1 * | 4/2006 | Ram | 345/1.1 |

* cited by examiner

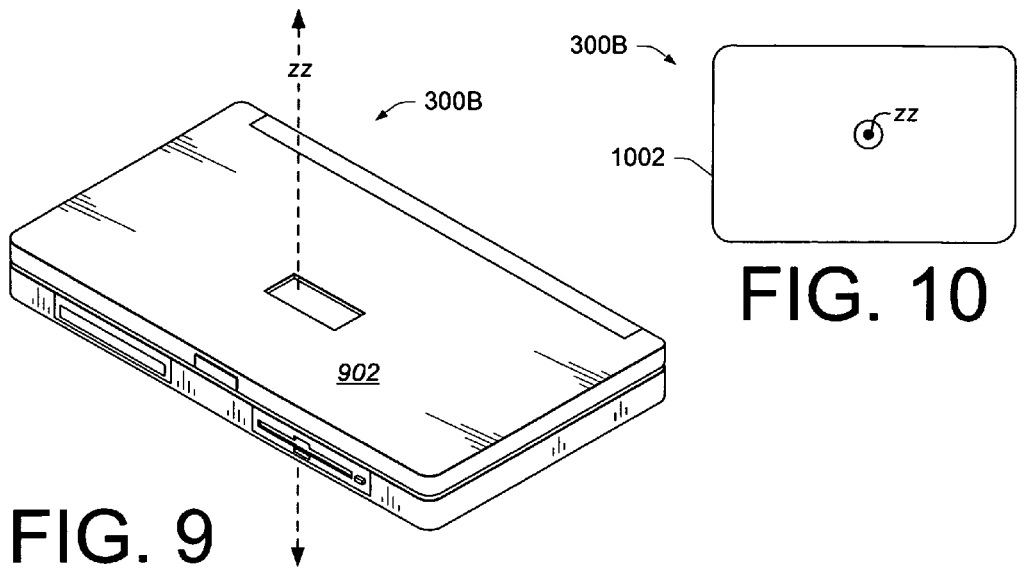
FIG. 9
FIG. 10
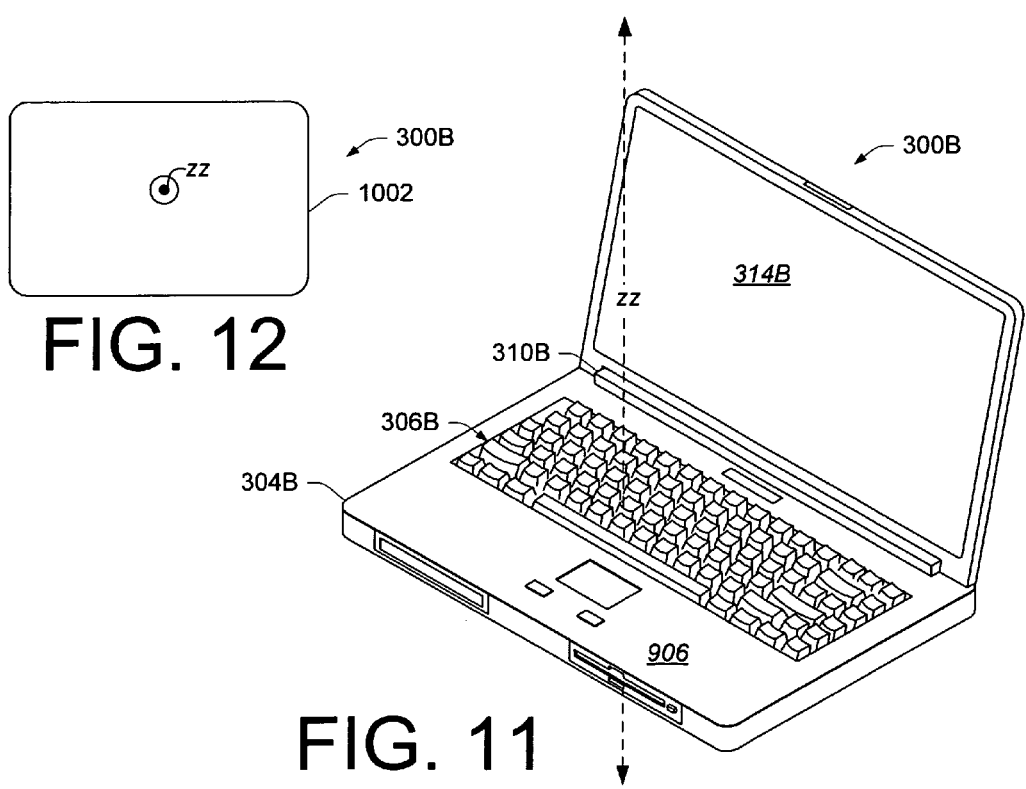
FIG. 12
FIG. 11

NOTEBOOK COMPUTERS CONFIGURED TO PROVIDE ENHANCED DISPLAY FEATURES FOR A USER

BACKGROUND

Notebook computers have become a tool of choice for today's computer users, such as knowledge workers, students and others. A notebook computer can provide similar functionality to a desktop computer in a package which the user can readily take with him/her as convenience dictates. Such flexibility can produce enhanced user satisfaction and/or user productivity. While current notebook computers satisfy many user needs, enhanced functionality is desired to further enhance the user experience.

SUMMARY

Systems and methods relating to notebook computers providing enhanced display features are described. In one instance, an exemplary notebook computer includes a housing. The housing includes a base that has a keyboard positioned on the base. The housing also includes a lid attached to the base via a hinge means and configured to swing from a transport-position against the keyboard to a user-position away from the keyboard. The notebook computer also includes a first display device positioned on the lid and generally opposing the keyboard. The notebook computer further includes a second optionally-deployable display device attached to the notebook computer and configured to deploy from a first storage-position to a second user-position in which the second optionally-deployable display device is configured to collectively create a user workspace with the first display device for a user positioned in front of the keyboard and generally opposite the hinge means. The second optionally-deployable display device is further configured to deploy to a third presentation-position configured to be perceptible to a non-user.

BRIEF DESCRIPTION OF THE DRAWINGS

FIGS. 3-9 illustrate perspective views of exemplary notebook computers providing enhanced display features in accordance with one implementation.

FIG. 10 illustrates a top view of the exemplary notebook illustrated in FIG. 9 in accordance with one implementation.

FIG. 11 illustrates a perspective view of an exemplary notebook computer providing enhanced display features in accordance with one implementation.

FIG. 12 illustrates a top view of the exemplary notebook computer illustrated in FIG. 11 in accordance with one implementation.

DETAILED DESCRIPTION

Overview

Figure 1:
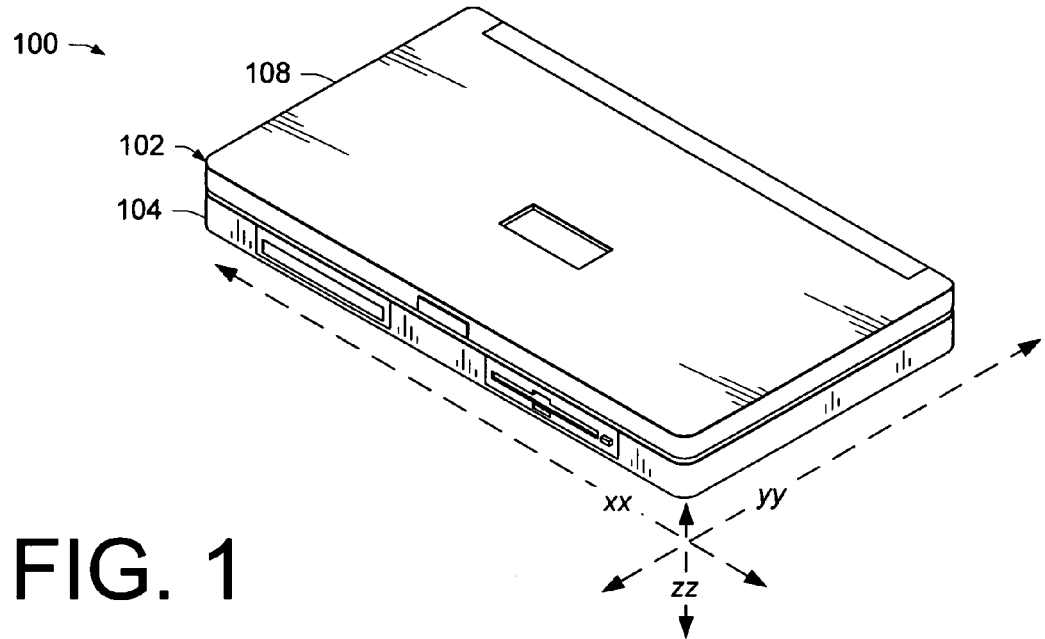
FIGS. 1-2 illustrate perspective views of a traditional prior art notebook computer.

Exemplary notebook computers are described below which are configured to provide enhanced display features for a user. At least some implementations can maintain a general look and feel of a traditional notebook computer in some configurations while providing enhanced display features in other configurations. For instance, some implementations have a first display configured to generate a first display area for the user in a traditional manner. These implementations also have one or more optionally-deployable display devices. The optionally-deployable display devices can be stored in a storage position where the notebook computer maintains a generally traditional look and feel. The optionally-deployable display devices are configured to provide additional display area for displaying a user-interface for the user when deployed from the storage position to a user position. In some of these implementations, the optionally-deployable display devices can be alternatively deployed to a presentation-position where the optionally-deployable display devices can be visible to other viewers who may not be positioned to view a display which is oriented for the user.

Exemplary Implementations

Various exemplary implementations are described below by way of example. For purposes of comparison consider FIGS. 1-2 which illustrate a traditional or prior art notebook computer 100. This notebook computer includes a housing 102 comprising: a base 104 having a keyboard 106 positioned thereon and a lid 108 attached to the base 104 via a hinge means 110 and configured to swing from a transport-position, illustrated in FIG. 1, against the keyboard 106 to a user-position, indicated in FIG. 2, away from the keyboard 106. A display device 112 is positioned on the lid 108 such that the display device generally opposes keyboard 106. This traditional notebook design, among other deficiencies, creates two countervailing user desires. On the one hand, many users desire the notebook computer to have as small of dimensions as possible as represented here along the xx-axis and the yy-axis. On the other hand, many of these same users desire increased workspace or display area 114 upon which a user-interface can be displayed. Many users feel that a relatively higher number of square inches of display area results in higher user productivity. In this traditional configuration, the dimensions of the display device which generates the display area is limited by the dimensions of the lid in the xx and yy directions. As such, design constraints cause display area to be sacrificed for the sake or portability or vice versa.

First Exemplary Implementation

Figure 2:
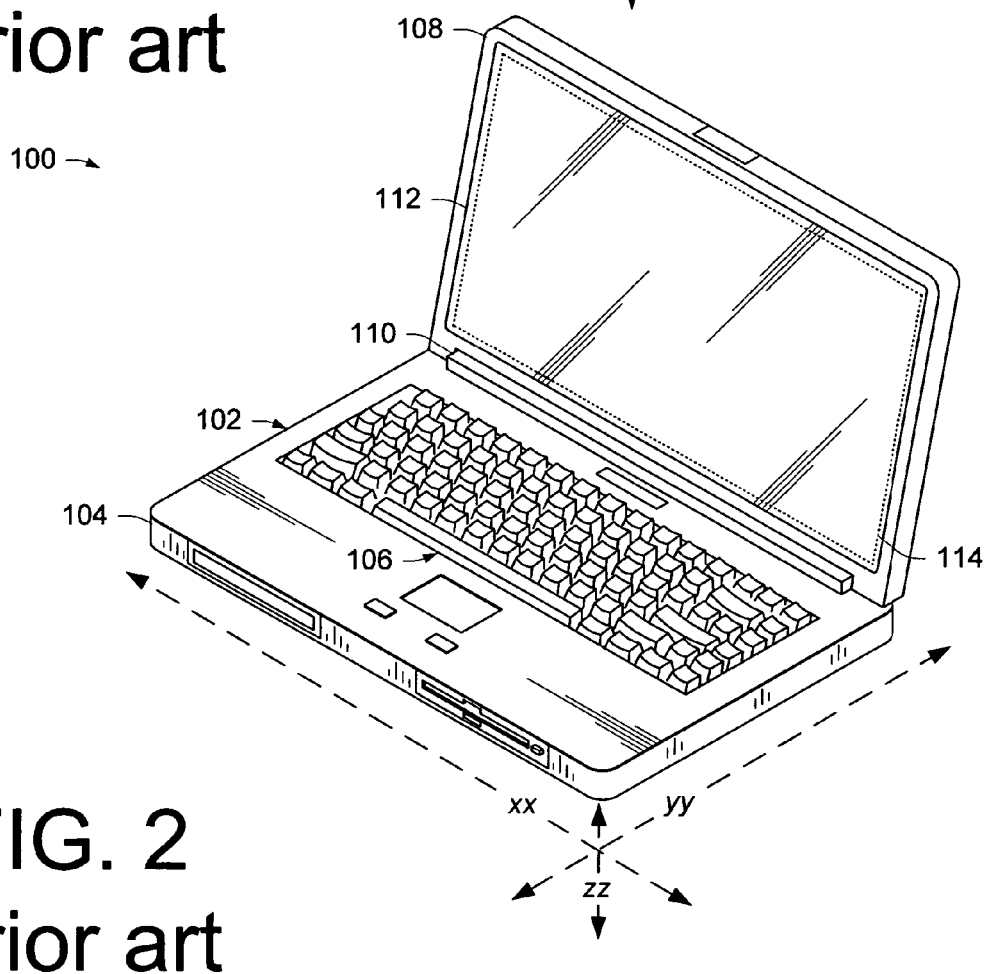

In contrast to the traditional notebook computer of FIGS. 1-2, consider FIGS. 3-7 as illustrating an example of an exemplary notebook computer 300 providing enhanced display features for the user. The following description relates to FIGS. 3-7 collectively, though references to specific Figures may be called out for purposes of explanation.

Figure 3:
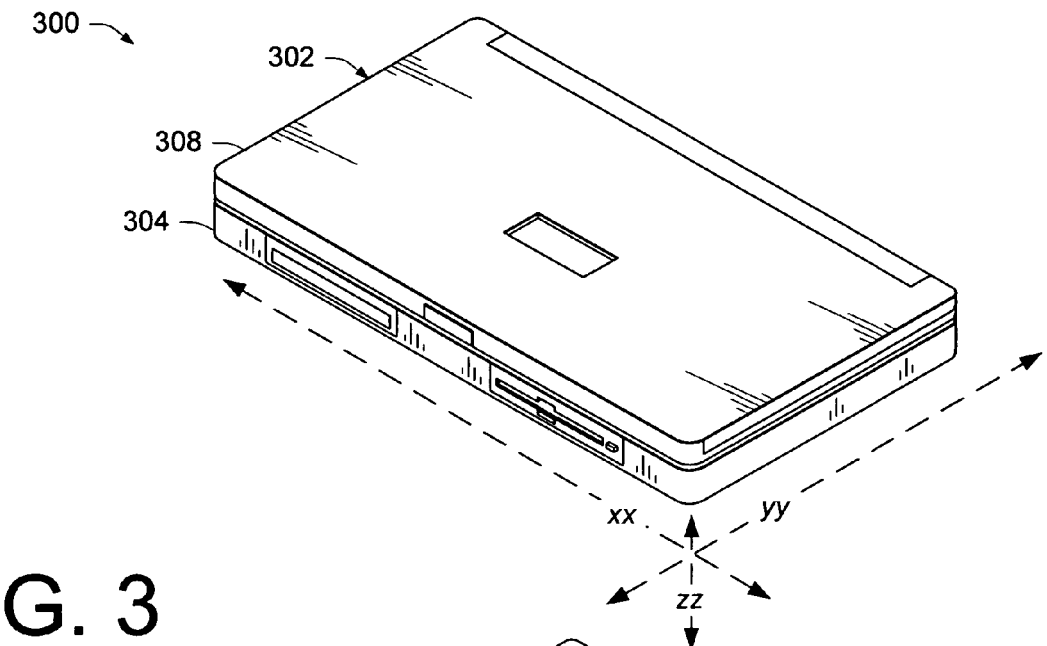

As illustrated in FIGS. 3-7, exemplary notebook computer 300 includes a housing 302 comprising: a base 304 having a keyboard 306 positioned thereon; and a lid 308 attached to the base 304 via a hinge means 310 and configured to rotate about an axis aa from a transport-position, illustrated in FIG. 3, against the keyboard 306 to a user-position, indicated in FIG.

4, away from the keyboard 306. A first display device 312 is positioned on the lid 308 such that the display device generally opposes keyboard 306. In at least some implementations, a user can quickly open notebook computer 300 from the transport-position of FIG. 3 to the user-position of FIG. 4.

Figure 4:
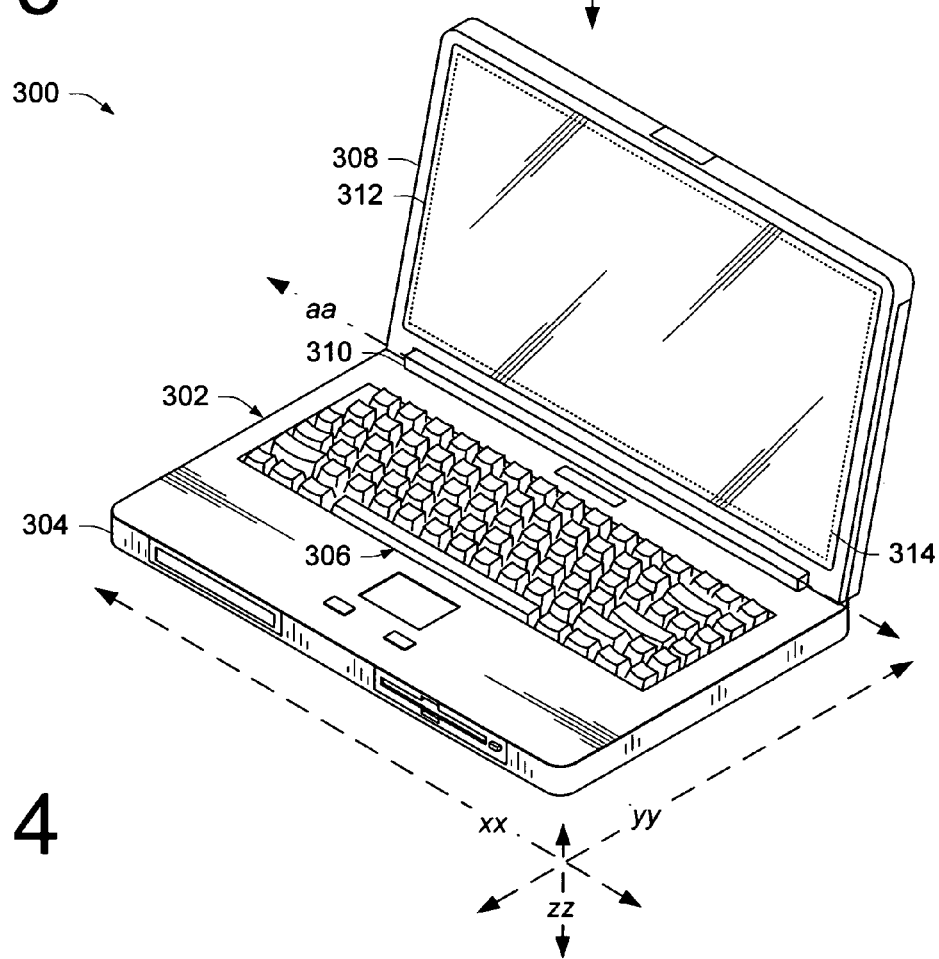
Figure 5:
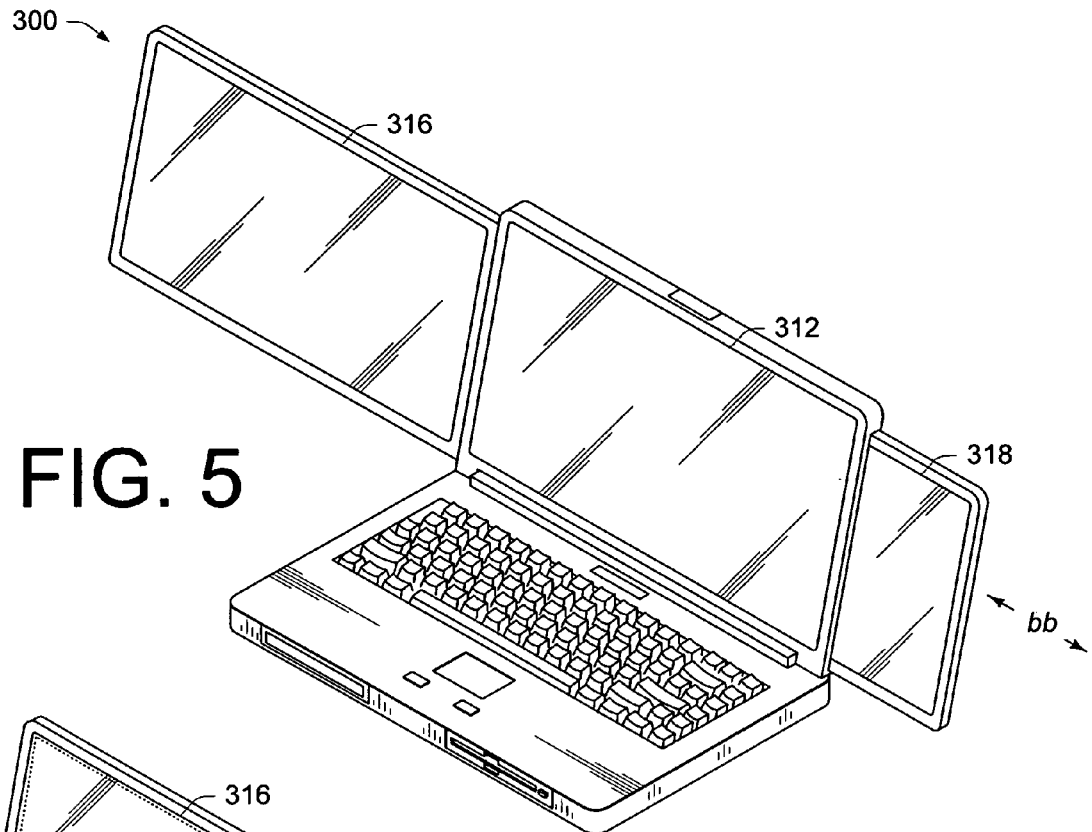
Figure 6:
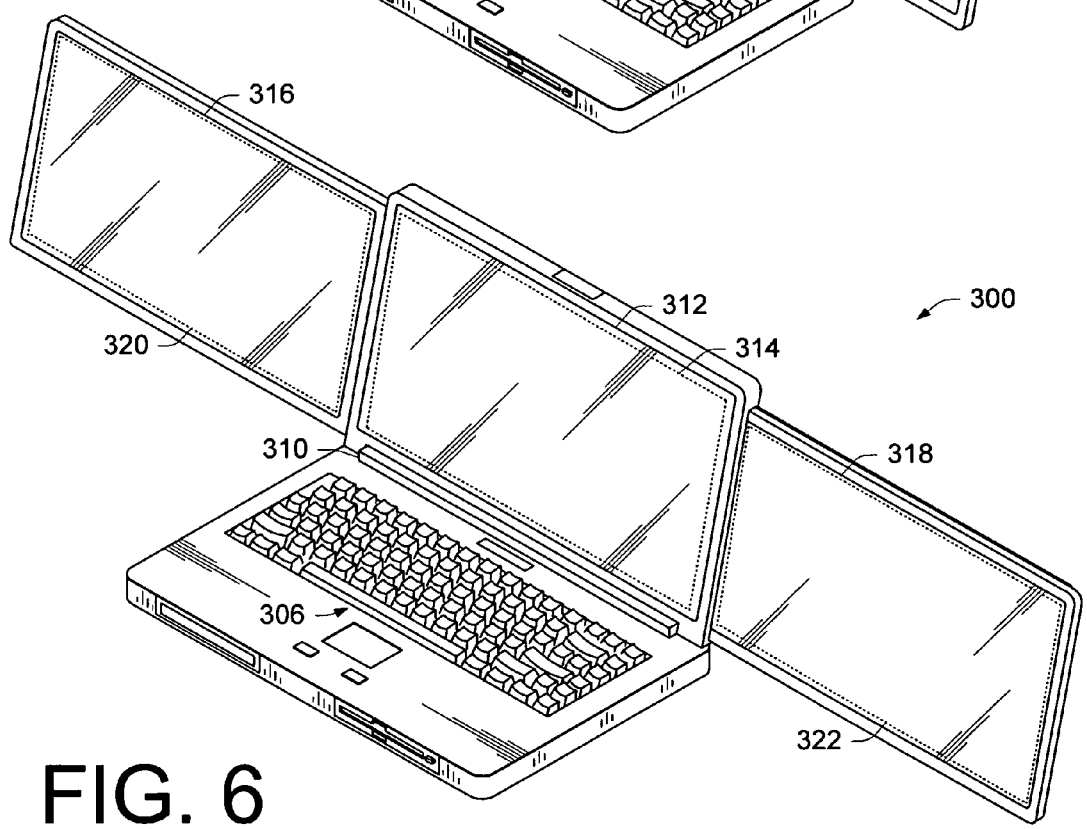

As illustrated in FIG. 4, a display area 314, generated by first display device 312, is configured to display the computer's user-interface and to be perceptible to a user positioned in the user-position generally opposite the hinge means 310 to engage the keyboard 306. Such a configuration can be useful when the user wants to quickly and easily engage the computer for brief periods, or where space is constrained, such as in an airline seat.

In addition to first display device 312, notebook computer 300 also has at least one other optionally-deployable display device. In this implementation, notebook computer 300 also has a second optionally-deployable display device 316, and a third optionally-deployable display device 318. The second and third optionally-deployable display devices 316, 318 are in a storage-position in FIGS. 3-4. The storage position offers protection to the optionally-deployable second and third display device 316, 318. Further, in the storage position, optionally-deployable second and third display device 316, 318 need not affect xx and yy dimensions of notebook 300. The second and third optionally-deployable display devices 316, 318 are configured to deploy about an axis bb and are further illustrated partially deployed to a user-position in FIG. 5 and fully deployed to the user-position in FIG. 6. In this instance, the second and third optionally-deployable display devices are slideably deployable along the bb-axis. In at least some implementations, a user-position is considered to be any orientation generally facing the user so that the user can view the optionally-deployable display device's display area. For instance, in relation to FIG. 6, a user-positioned in the user-position in front of the keyboard 306 and opposite the hinge means 310 can see display area 314 as well as second display device's display area 320 and third display device's display area 322. In the instance, of FIG. 6, the three display devices 312, 316, and 318 are arranged generally linearly for a user. Other configurations are described below.

In instances, where a user desires increased display area, such as for displaying the user-interface, the first, second, and/or third display devices 312, 316, and 318 can be utilized to collectively display the user-interface on their respective display areas. Such a configuration satisfies a user desire of increased number of square inches of display area while still allowing the notebook computer to have relatively small transport dimensions when the optionally-deployable second and third display devices 316, 318 are in a storage-position.

As a further user option, in at least some implementations, the optionally-deployable second and/or third display devices 316, 318 can be further configured to deploy to a third presentation-position which is configured to be perceptible to a non-user. In this instance, the optionally-deployable second and third display devices 316, 318 are configured to rotate about a cc-axis and a dd-axis respectively to achieve a presentation position. In this particular instance, the cc-axis and a dd-axis are orthogonal to the aa-axis about which the lid deploys. Other configurations are described below.

Figure 7:
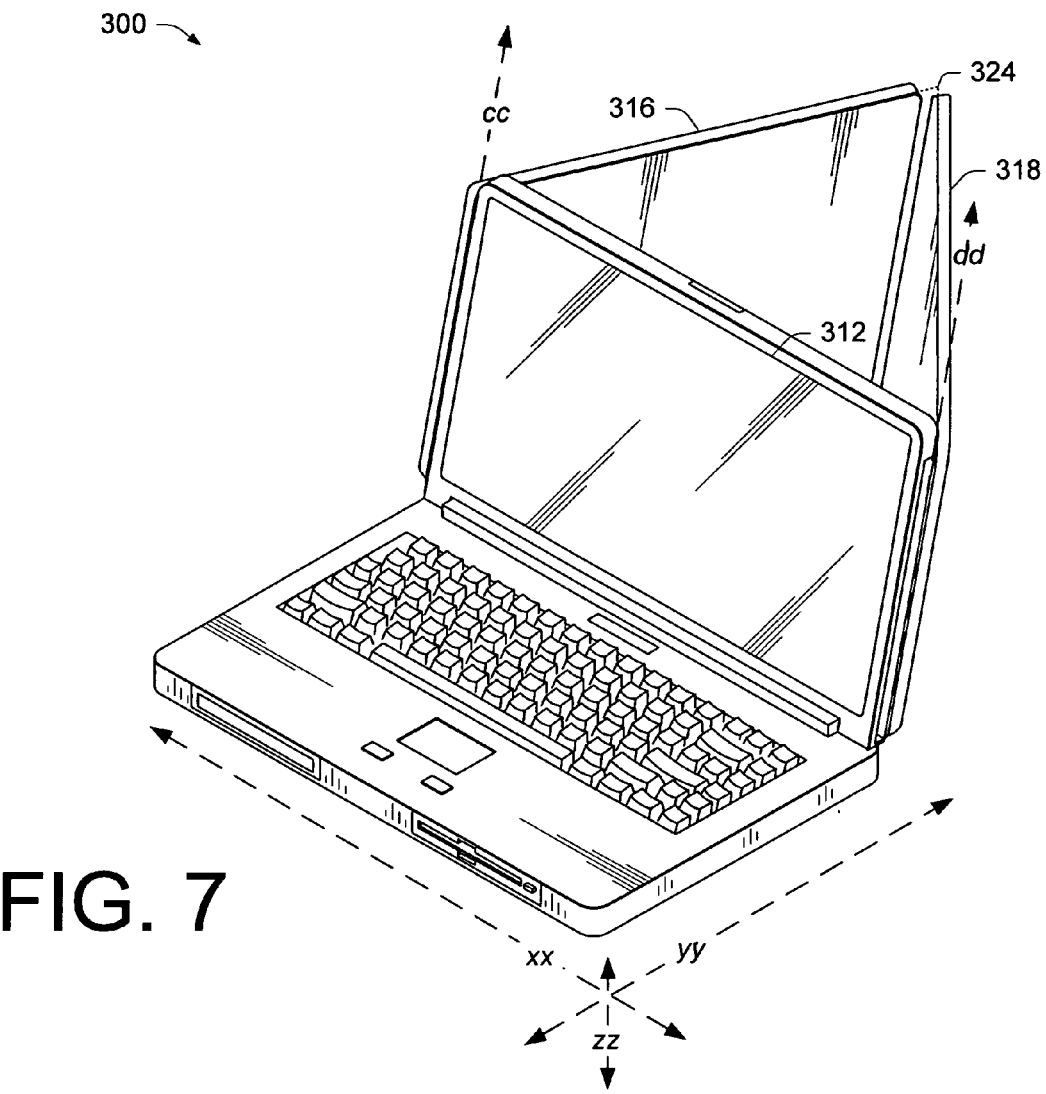

An example of a presentation-position is illustrated in FIG. 7. In this instance, presentation position of optionally-deployable second and/or third display devices 316, 318 in combination with display device 312 approximates a portion of a triangle 324 when viewed from above the notebook computer along the zz-axis. Examples of other presentation position configurations are described below.

A presentation-position configuration allows viewers who cannot easily see the first display device 312 to view some or all of the first display device's user-interface content on the optionally-deployable second and/or third display devices 316, 318. For instance, assume that a user places notebook computer 300 on a conference table and is explaining ways to access and utilize a new application of the user-interface to colleagues positioned around the table. The presentation-position allows display device 312 to be visible to the user while one or more optionally-deployable display devices can be directed to viewers who cannot readily see the display area 314 of display device 312. In this instance, each display device 312, 316, and 318 is configured to individually display the entire user-interface. So for instance, relative to the example mentioned above, such a configuration can allow the user to show the colleagues a tool bar from which the application can be accessed or a specific icon which can be selected to access the application. Individual colleagues can view any of the three display devices 312, 316, 318 which are most convenient.

Consider another presentation scenario where a user has a set of digital slides which comprise a subset of the user-interface displayed on display device 312. Assume once again that the user is seated at a conference table and that the user wants the slides to be visible to other viewers who cannot readily see the display area 314 of display device 312. In this configuration, the user may have the slides and additional notes on the user-interface which the user wants to be able to see, but the user only wants the slides displayed for the other viewers. At least some implementations allow the user to designate a sub-portion of the user-interface, which in this instance is the slides, to be displayed on optionally-deployable display devices 316, 318 when these display devices are in the presentation-position.

For ease of explanation, FIGS. 3-7 illustrate optionally-deployable display devices 316, 318 in corresponding states. For instance, both optionally-deployable display devices 316, 318 are in the stored position, or both are in the user-position or both are in the presentation-position. Such, however, need not be the case. In at least some implementations, the user can utilize the display features of the notebook computer as he/she desires in a particular instance. For example, a user could deploy optionally-deployable display device 316 to the user-position while leaving display device 318 in the storage position. In another example, optionally-deployable display device 316 could be utilized in the user-position to collectively display the user-interface with display device 312, while optionally-deployable display device 318 is in a presentation-position and displays some or all of the user-interface to other viewers.

Second Exemplary Implementation

Figure 8:
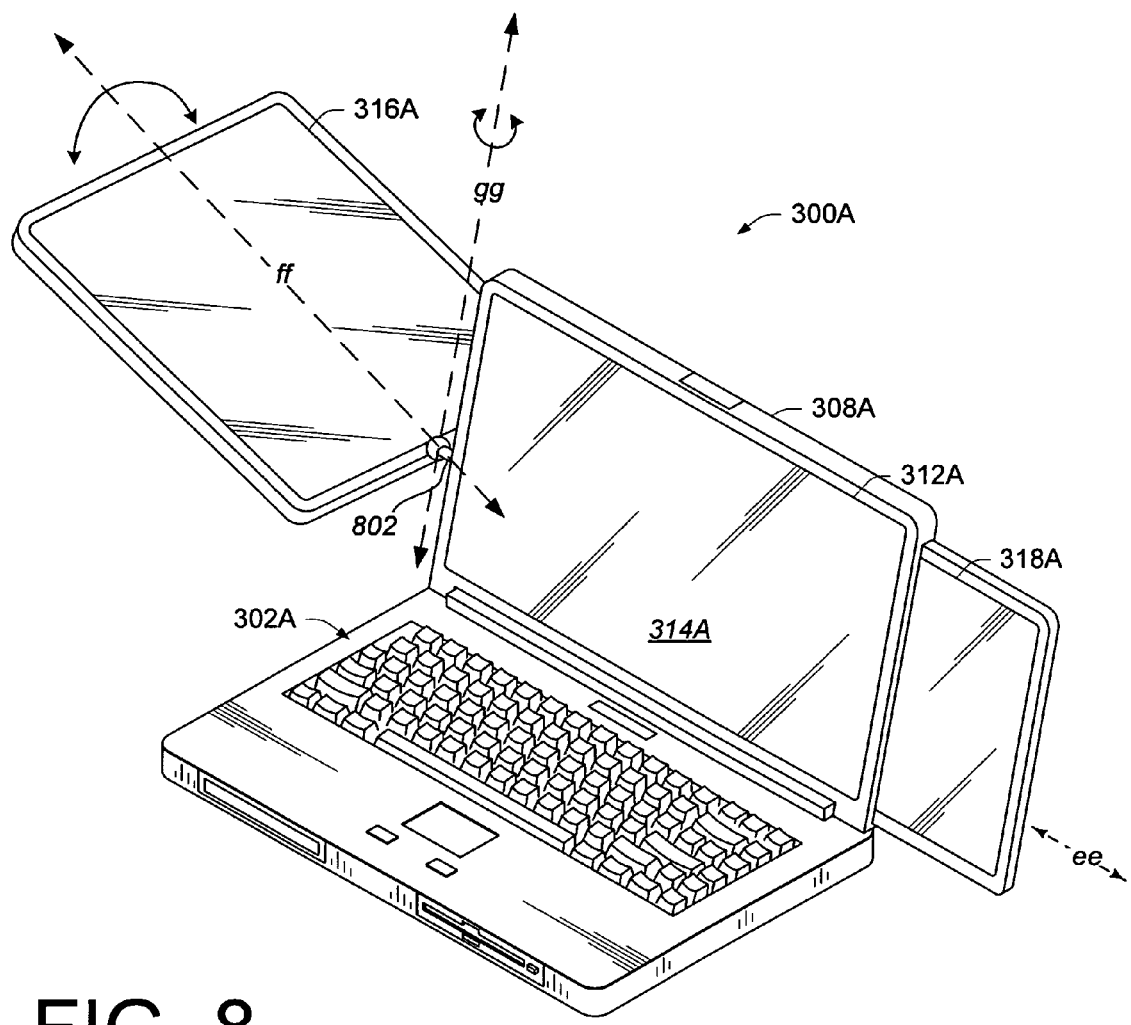

FIG. 8 illustrates an implementation of a notebook computer 300A which facilitates independent use of optionally-deployable display devices 316A, 318A. In this implementation, optionally-deployable display devices 316A, 318A are slideably received into, and slideably deploy from, lid 308A as indicated generally by arrow or axis ee. FIG. 8 illustrates display device 318A partially deployed from lid 308A, while display device 316A is fully deployed. In this instance, optionally-deployable display device hinge means 802 illustrated in relation to display device 316A is configured to allow display device 316A to be deployed by being rotated about a ff-axis and/or a gg-axis, which in this instance are different from the ee-axis. Such a configuration allows the user to conveniently position the display device in a user-position or a presentation-position as desired. For example, in this instance, the user can easily adjust either display device 316A or display device 318A toward any viewer proximate notebook computer 300A who is not able to see the display area 314A of display device 312A.

In some implementations, notebook computer 300A may include a sensor means for determining a relative position of optionally-deployable display devices 316A, 318A. For instance, in but one configuration, the sensor means may be associated with hinge means 802 to provide positional data from the hinge means which relates to an associated optionally-deployable display device which in this instance is display device 316A. Various other types of sensor means for determining a relative position of an optionally-deployable display device should be recognized by the skilled artisan.

Further, in this implementation, optionally-deployable display devices 316A, 318A are at least partially protected by housing 302A when the display devices are in the storage position. Other examples of how the housing can protect the optionally-deployable display device in their storage position are described above and below. In this particular configuration, the storage position of second and third optionally-deployable display devices 316A, 318A is at least partially within the housing's lid 308A. In such a configuration, the housing provides protection to the second and third optionally-deployable display devices when they are stored. So, for example, if the user is transporting the notebook computer 300A with optionally-deployable second and third display device in the storage position and bumps the notebook computer into an object, such as a chair, the housing 302A provides mechanical protection to the optionally-deployable second and third display devices 316A, 318A.

Third Exemplary Implementation

Figure 13:
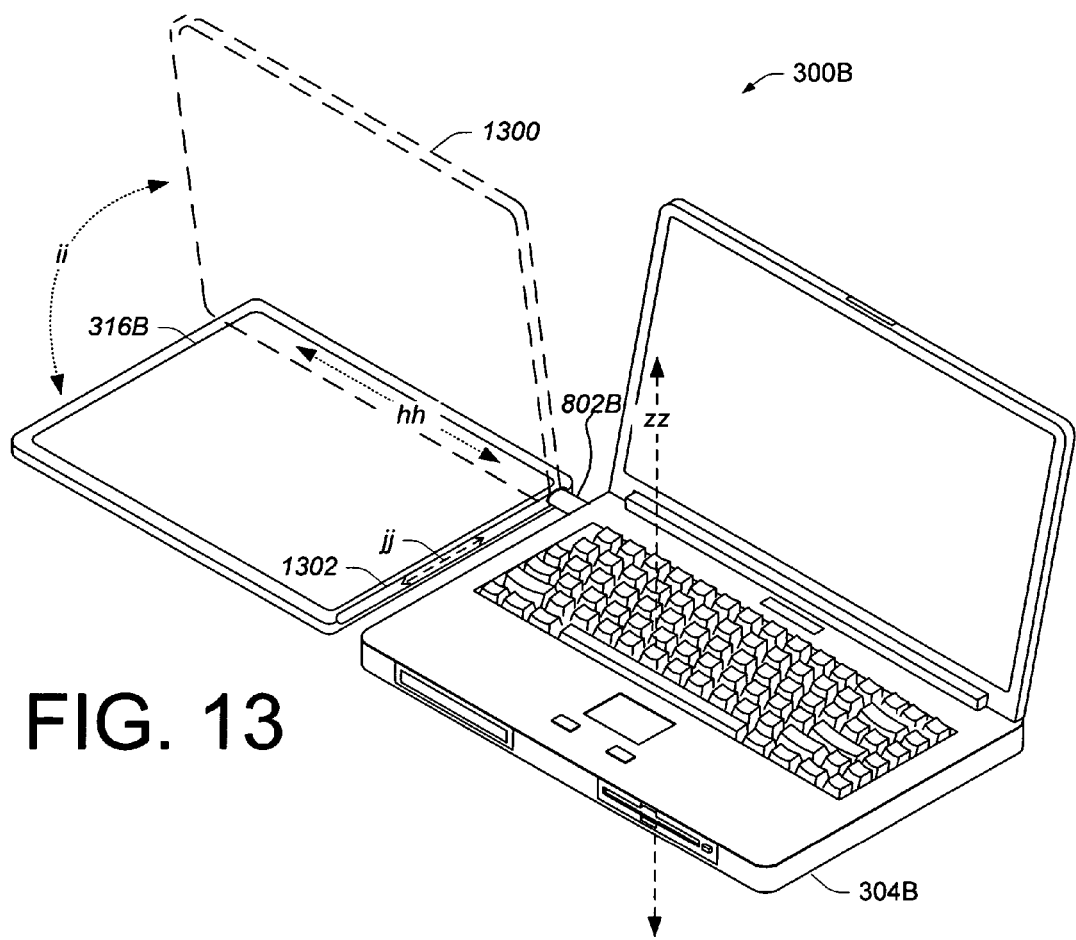
FIGS. 13-18 illustrate perspective views of exemplary notebook computers providing enhanced display features in accordance with one implementation.

FIGS. 9-13 collectively illustrate still another exemplary implementation of a notebook computer 300B providing enhanced user display features. FIGS. 9, 11, and 13 represent perspective views of exemplary notebook computer 300B. FIGS. 10, 12 represent top views along a zz-axis of notebook computer 300B of the configurations illustrated in FIGS. 9, 11, respectively. In this instance, as can be appreciated from FIG. 11, the lid 308B supports a first generally planar display area 314B which faces the base 304B in the transport-position.

FIG. 9 shows the transport-position of notebook computer 300B where lid 308B is positioned against the base 304B. In the transport-position of FIG. 9, the zz-axis is transverse the first display area 314B which is blocked from view by lid 308B. In this instance, lid 308B defines a first generally planar major surface 902 which lies generally parallel to first display area 314B. Further, base 302B defines a generally planar second major surface 906 upon which keyboard 306B resides. In the storage position, the zz-axis is transverse the first generally planar major surface 902, the first display area 314B and the generally planar second major surface 906. When viewed along the z-axis, housing 302B defines a footprint 1002 of notebook computer 300B.

In notebook computer 300B, the lid 308B is configured to swing from the transport-position of FIG. 9 against the base 304B to a user-position away from the base 304B where the display area 314B is visible to a user-positioned oppositely the hinge means 310B as indicated in FIG. 11. As can be evidenced from FIG. 12, footprint 1002 remains substantially unchanged when the notebook computer is opened from the transport-position of FIG. 9 to the user-position of FIG. 11. Such a notebook configuration is useful for situations where a user desires to maintain a minimum footprint or user-area of notebook computer 300C. As mentioned above, among other scenarios, such a configuration may be useful in limited space scenarios, such as may be experienced on an airline or in a car or bus among others.

FIG. 13 illustrates an optionally-deployable display device 316B partially deployed to enhance the display features of notebook computer 300B. In this instance, the optionally-deployable display device stores in the base 304B of the notebook computer 300B and slides or deploys outward along arrow hh as indicated in FIG. 13. Once optionally-deployable display device 316B is free of base 304B, the optionally-deployable display device can be pivoted upwardly along arrow ii to orient the display for a user as indicated generally by a dashed outline indicated at 1300. In this instance, optionally-deployable display device's display area is facing downward toward a surface on which the notebook computer is sitting and as such is not specifically designated. Alternatively, in this instance, if the user desires to orient the optionally-deployable display device 316B in a presentation-position the user can slide the display device's channel 1302 along the hinge means 802B as indicated generally by axis or arrow jj. The user can then tilt the optionally-deployable display device upwardly so that the optionally-deployable display device's display area is facing generally away from the user.

Fourth Exemplary Implementation

FIGS. 14-20 collectively illustrate another exemplary notebook computer 300C providing enhanced display features. Exemplary notebook computer 300C includes two optionally-deployable display devices 316C, 318C. In this implementation, optionally-deployable display devices 316C, 318C are hinged at opposing ends of lid 308C and store folded against the lid in a layered fashion as can be appreciated from FIGS. 14-15. In this instance, individual optionally-deployable display devices include a display area 320C, 322C and a generally opposing housing portion 1402, 1404 respectively.

Figure 14:
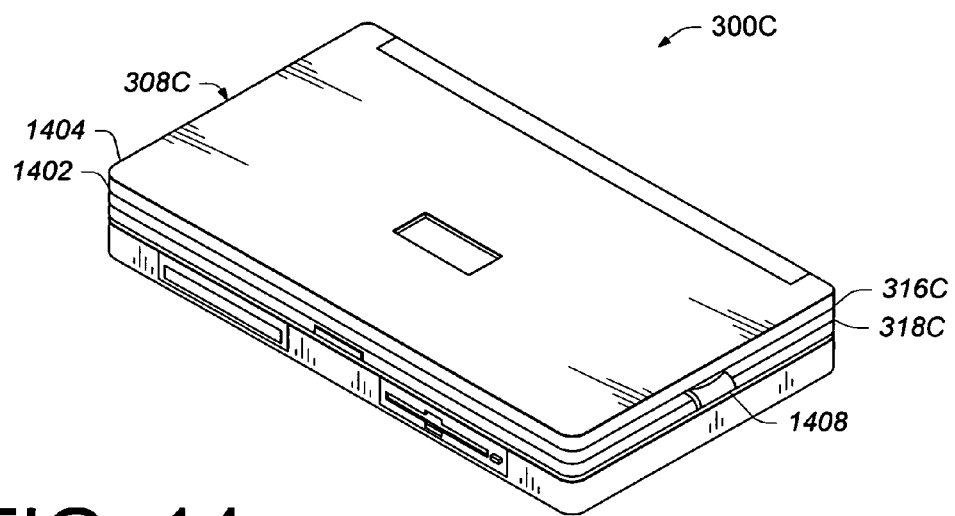
Figure 15:
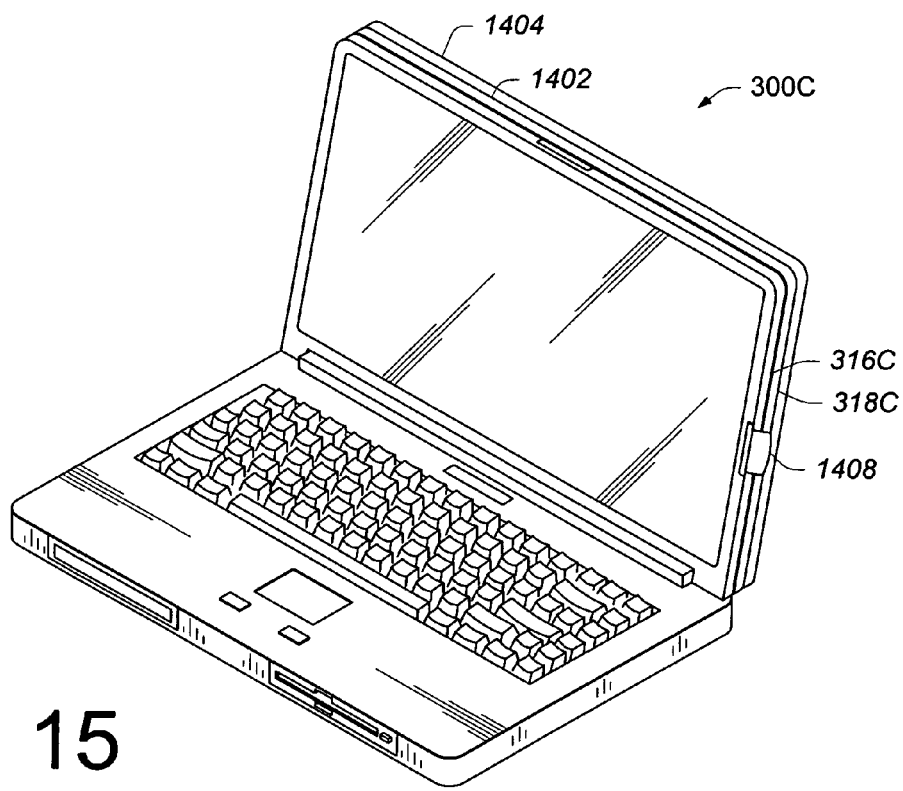
Figure 16:
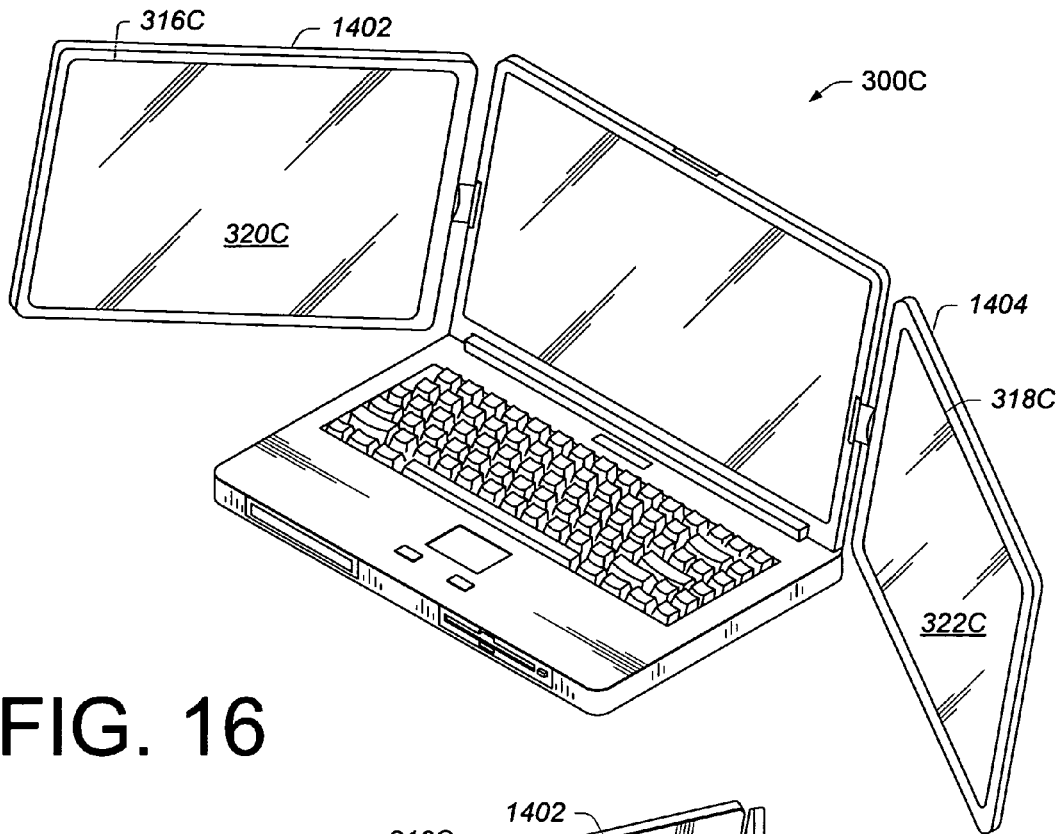
Figure 17:
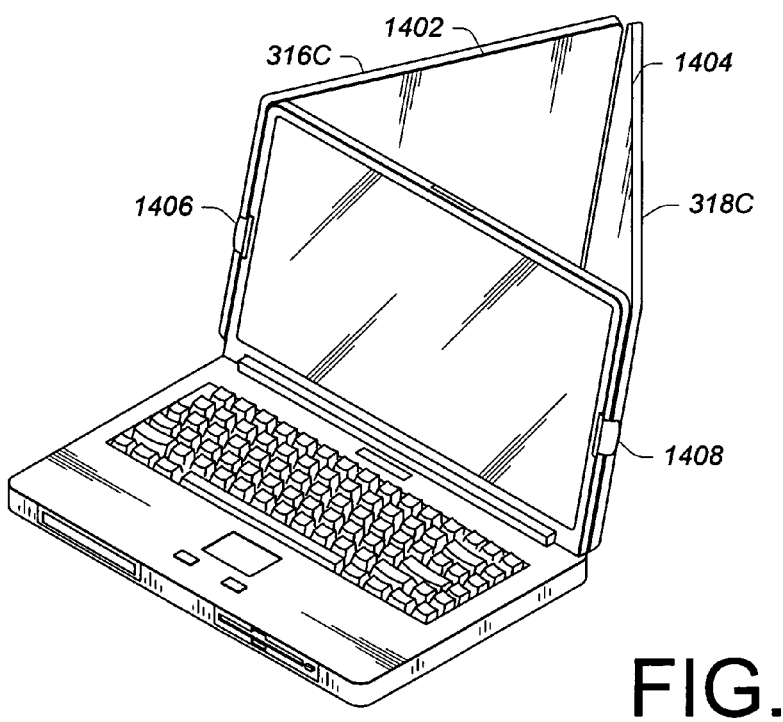
Figure 18:
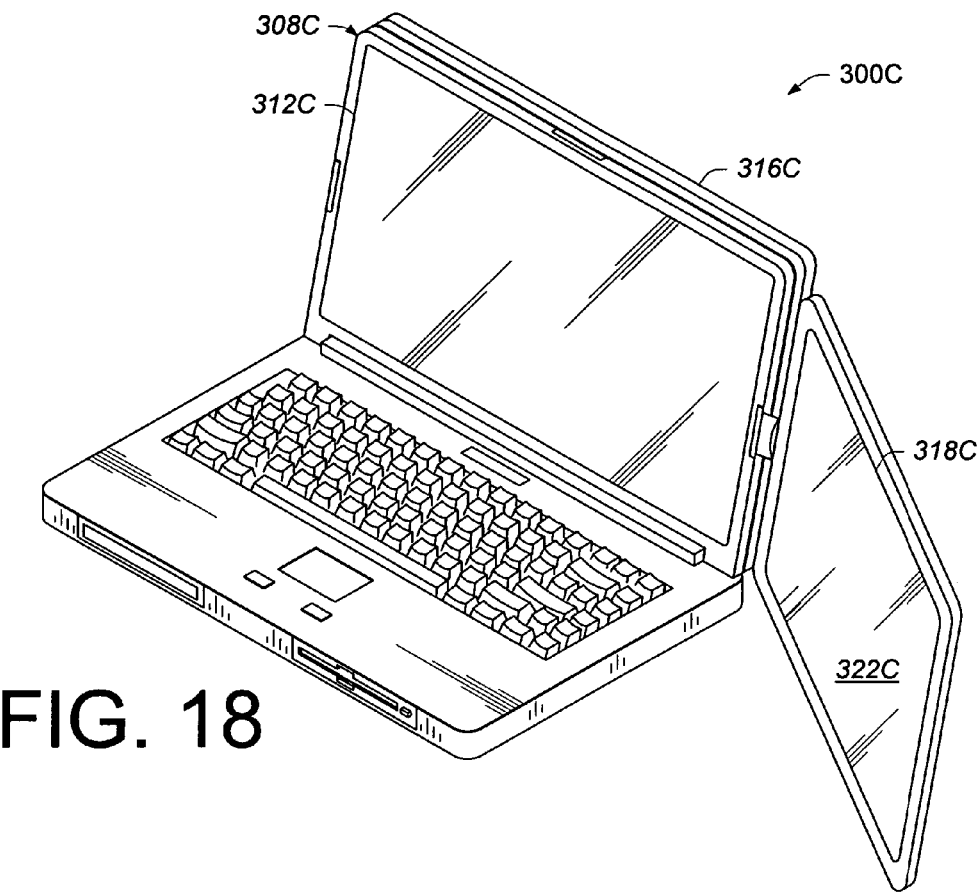
Figure 19:
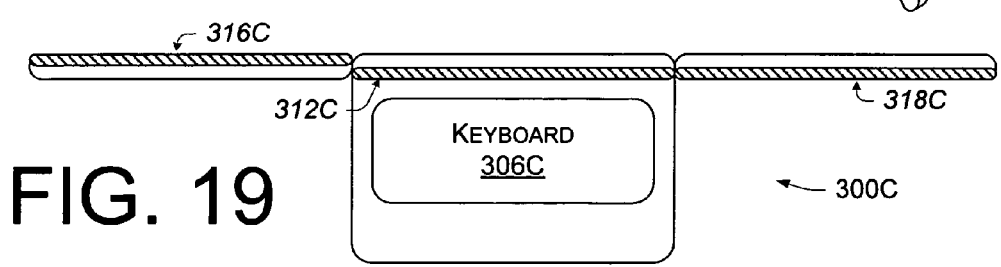
FIGS. 19-20 illustrate top views of exemplary notebook computers providing enhanced display features in accordance with one implementation.
Figure 20:
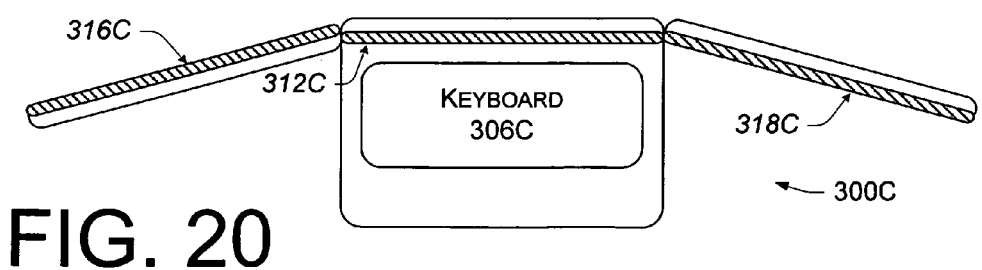

This particular implementation provides an example where, in the storage position of the optionally-deployable display devices 316C, 318C as indicated in FIGS. 14-15, the optionally-deployable display device's housing portion 1402, 1404 protects the respective display area 320C, 322C respectively. Further, hinge means 1406, 1408 allow the user to swing an individual optionally-deployable display device, as well as to rotate the display device. Such a configuration can, for instance, enable the display area to be rotated and swung into a user-position as evidenced in FIG. 16, a presentation-position as evidenced in FIG. 17, and also to face against the lid 308C in the storage position as evidenced in FIGS. 14-15. Such a configuration also allows optionally-deployable display device 318C to be rotated and swung into a user-position of FIG. 18, while optionally-deployable display device 316C can be swung away from the storage position against lid 308C, rotated 180 degrees and swung back against the lid to provide a presentation-position where the optionally-deployable display device 316C faces generally opposite display device 312C. FIGS. 19-20 illustrate top views of two additional configurations where optionally-deployable display device 316C is in a presentation-position while optionally-deployable display device 318C is in a user-position configuration. The skilled artisan should recognize still other configurations.

Fifth Exemplary Implementation

Figure 21:
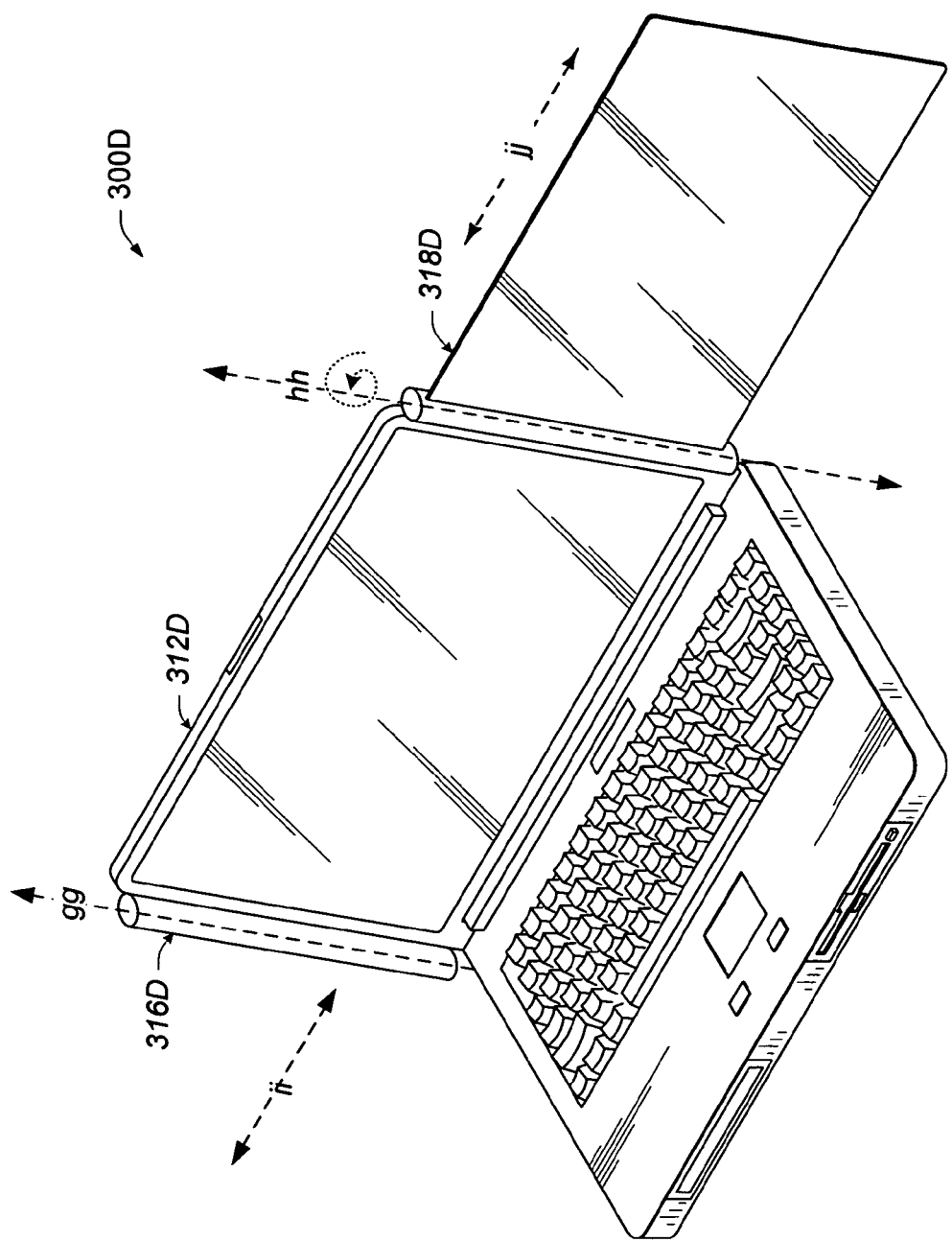
FIGS. 21-22 illustrate perspective views of exemplary notebook computers providing enhanced display features in accordance with one implementation.

FIG. 21 illustrates another exemplary implementation of a notebook computer 300D having a display device 312D and two optionally-deployable display devices 316D, 318D. The display device can be Organic Light Emitting Diode (OLED), Liquid Crystal Display (LCD), plasma, or a developing or yet to be developed display technology. In this instance, the optionally-deployable display devices are sufficiently flexible to roll around an axis gg, hh respectively into a storage position as indicated with optionally-deployable display devices 316D. The optionally-deployable display devices can be extended along an axis or arrow ii, jj respectively into a generally planar configuration to achieve a user-position or presentation-position such as is illustrated for optionally-deployable display devices 318D. The skilled artisan should recognize still other exemplary optionally-deployable display device configurations.

Sixth Exemplary Implementation

Figure 22:
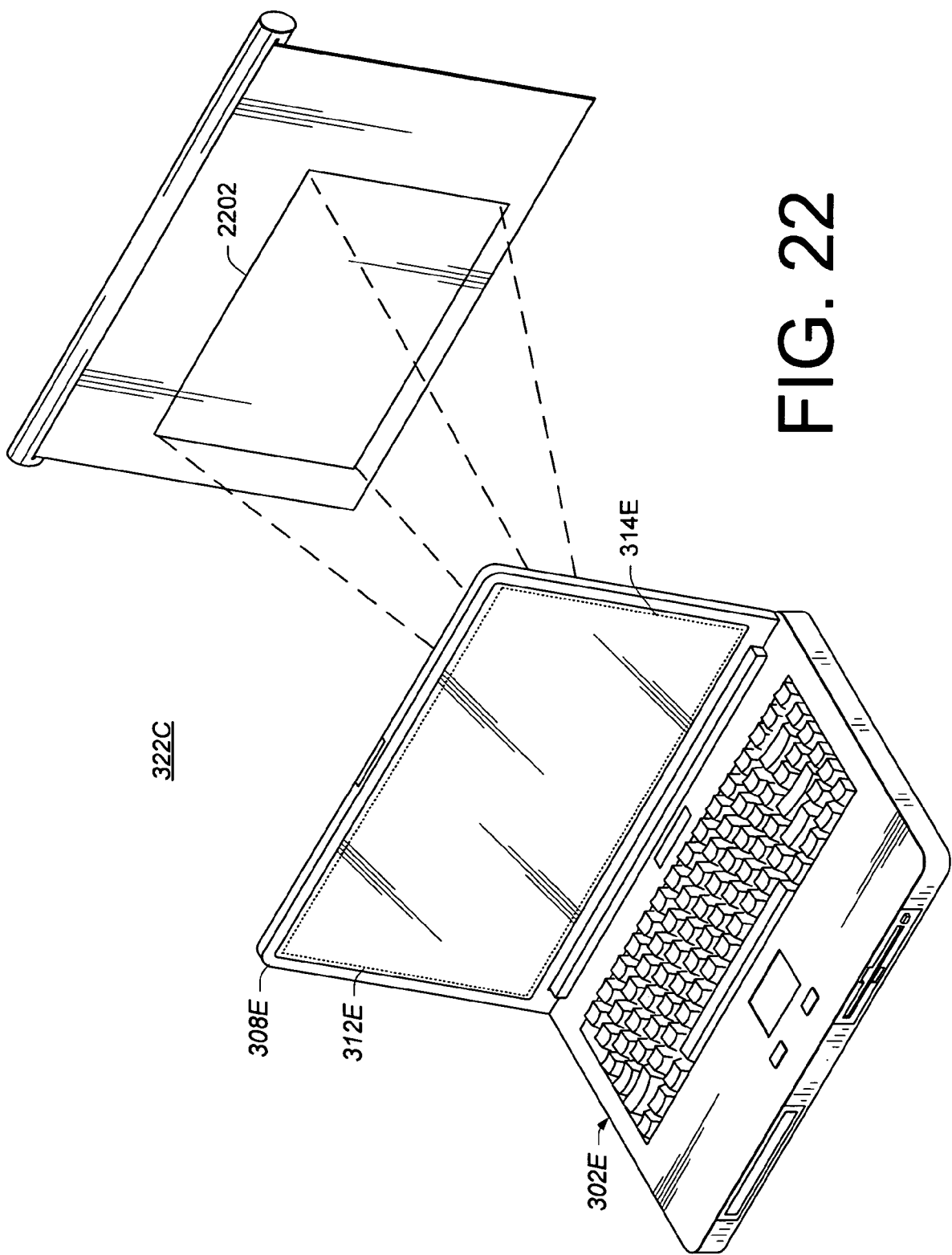

FIG. 22 illustrates another exemplary implementation of a notebook computer 300E having a display device 312E positioned on lid 308E of housing 302E. Display device 312E is configured to generate a display area 314E for the user. Notebook computer 300E also has a projection means (not specifically designated) for generating a second display area 2202 which can be projected onto any suitable surface and which can augment and/or supplant display area 314E without affecting a footprint of the notebook computer 300E. Footprints are described above in relation to FIGS. 9-12. This is but one example of an exemplary notebook computer which provides enhanced display features for the user while maintaining portability of the notebook computer.

Exemplary System Environment

Figure 23:
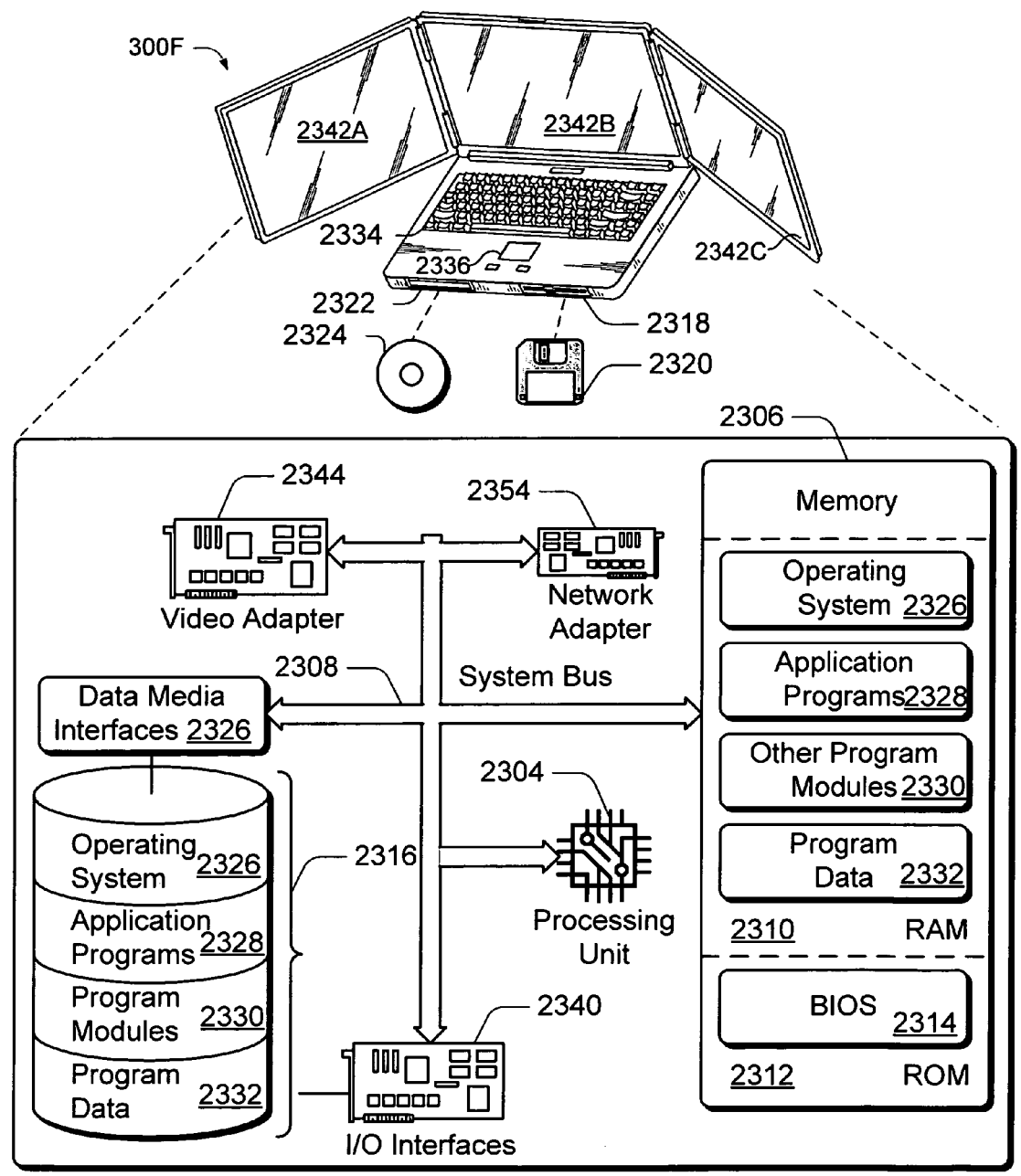
FIG. 23 illustrates components of an exemplary notebook computer providing enhanced display features in accordance with one implementation.

FIG. 23 represents an exemplary notebook computing device 300F providing enhanced display features. The components of notebook computing device 300F can include, but are not limited to, one or more processing units or processors 2304 (e.g., any of microprocessors, controllers, and the like), a memory 2306, and a bus 2308 that couples the various components. The one or more processors 2304 process various computer executable instructions to control the operation of notebook computing device 300F and to communicate with other electronic and computing devices. The bus 2308 represents any number of several types of bus structures, including a memory bus or memory controller, a peripheral bus, an accelerated graphics port, and a processor using any of a variety of bus architectures.

Portable computing device 300F includes a variety of computer readable media, examples of which include both volatile and non-volatile media, removable and non-removable media. The memory 2306 includes computer-readable media in the form of volatile memory, such as random access memory (RAM) 2310, and/or non-volatile memory, such as read only memory (ROM) 2312. A basic input/output system (BIOS) 2314 maintains the basic routines that facilitate information transfer between components within notebook computing device 300F, such as during start-up, and is stored in ROM 2312. RAM 2310 typically contains data and/or program modules that are immediately accessible to and/or presently operated on by one or more of the processors 2304.

Notebook computing device 300F may include other removable/non-removable, volatile/non-volatile computer storage media. By way of example, a hard disk drive 2316 reads from and writes to a non-removable, non-volatile magnetic media (not shown), a magnetic disk drive 2318 reads from and writes to a removable, non-volatile magnetic disk 2320 (e.g., a "floppy disk"), and an optical disk drive 2322 reads from and/or writes to a removable, non-volatile optical disk 2324 such as a CD-ROM, digital versatile disk (DVD), or any other type of optical media. In this example, the hard disk drive 2316, magnetic disk drive 2318, and optical disk drive 2322 are each connected to the bus 2308 by one or more data media interfaces 2326. The disk drives and associated computer readable media provide non-volatile storage of computer readable instructions, data structures, program modules, and other data for notebook computing device 300F.

Any number of program modules can be stored on the hard disk 2316, magnetic disk 2320, optical disk 2324, ROM 2312, and/or RAM 2310, including by way of example, an operating system 2326, one or more application programs 2328, other program modules 2330, and program data 2332. Each of such operating system 2326, application programs 2328, other program modules 2330, and program data 2332 (or some combination thereof) may include an embodiment of the systems and methods described herein for providing enhanced display features.

A user can interface with notebook computing device 300F via any number of different input devices such as a keyboard 2334 and trackpad 2336. Other input devices (not shown specifically) may include a microphone, joystick, game pad, controller, satellite dish, serial port, scanner, and/or the like. These and other input devices are connected to the processors 2304 via input/output interfaces 2340 that are coupled to the system bus 2308, but may be connected by other interface and bus structures, such as a parallel port, game port, and/or a universal serial bus (USB).

A plurality of display devices such as 2342A-2342C or other type of display device can be connected to the system bus 2308 via an interface, such as a video adapter 2344. Input/output interfaces 2340 can also be utilized to connect other components such as speakers or a printer to the notebook computing device 300F. The notebook computing device 300F also can be communicably coupled to various networks via a network interface or adapter 2354 or other communication means.

Exemplary Processes

Figure 24:
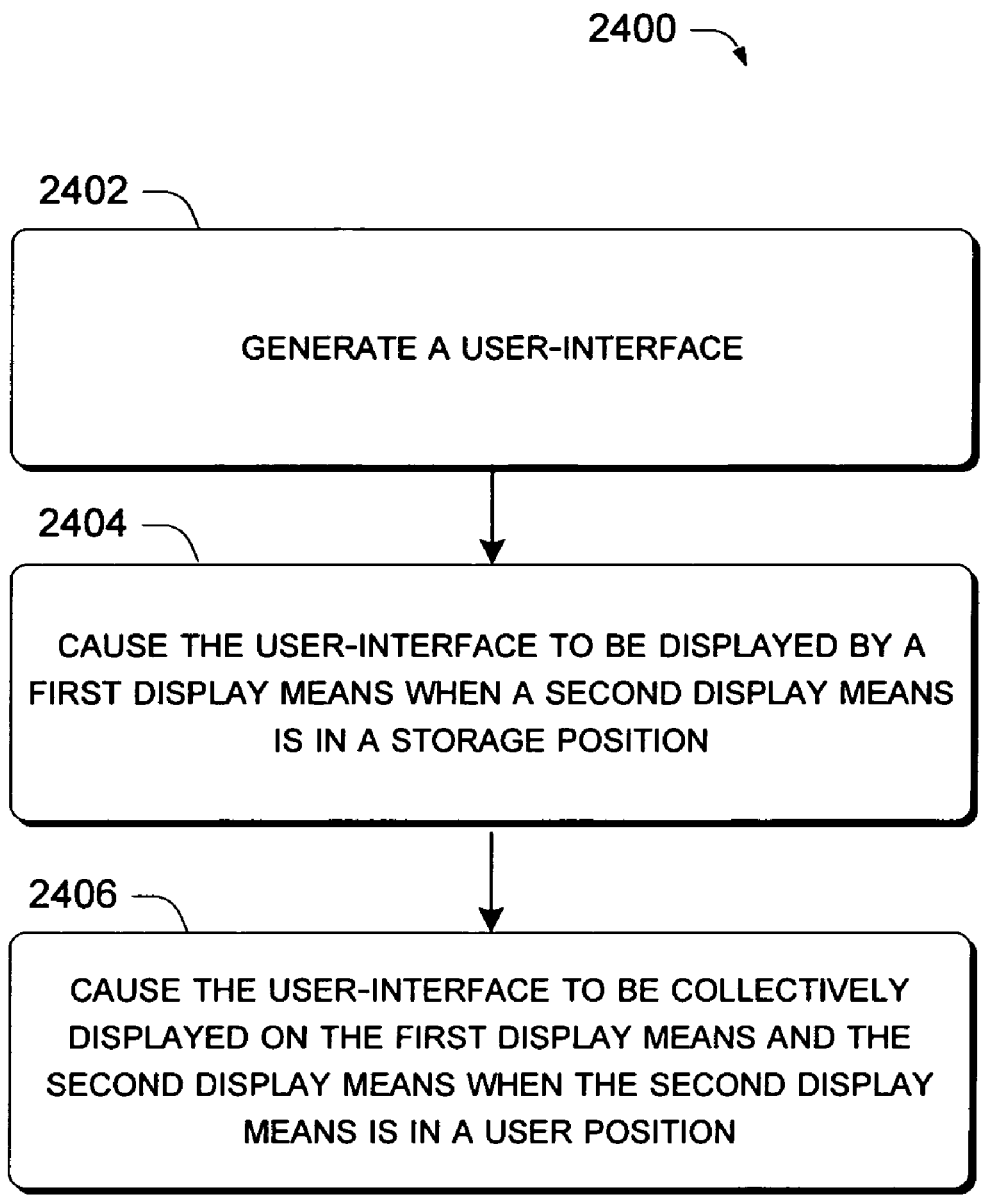
FIG. 24 illustrates a flow diagram for providing enhanced display features relative to an exemplary notebook computer in accordance with one implementation.

FIG. 24 illustrates an exemplary process 2400 for providing enhanced display features relative to a notebook computer. The order in which the process is described is not intended to be construed as a limitation, and any number of the described process blocks can be combined in any order to implement the process. Furthermore, the process can be implemented in any suitable hardware, software, firmware, or combination thereof.

At block 2402, the process generates a user-interface. The user interface can be generated by any combination of the operating system and/or various applications operating in cooperation with the operation system.

At block 2404, the process causes the user-interface to be displayed by a first display means when a second display means is in a storage position. In at least some implementations, in such an instance, the second display means is not intended to generate an image for a user. As such, in these implementation when the second display means is in the storage position the user-interface is displayed on the first display means. Various first display means are described above. For instance, in but one common implementation, the first display means is a liquid crystal device (LCD) and is attached to a notebook computer lid generally opposing the notebook computer's keyboard.

At block 2406, the process causes the user-interface to be collectively displayed on the first display means and the second display means when the second display means is in a user-position. In such an instance, an overall amount of square inches available for displaying the user-interface for a user can be increased compared to the square inches of display area utilized at process block 2404. Such a process may occur automatically through receiving sensory information that the second display means is in the user-position. In other implementations, the user may enter a command to cause the user-interface to be distributed between the first and second display means. The skilled artisan should recognize still other configurations.

Some of these processes may offer still another configuration, referred to here as a presentation configuration where the second display means is positioned to be viewed by a viewer other than the user. Some implementations allow a user to designate what content is displayed on the second display means when the second display means is positioned in a presentation position. For instance, the user may be allowed to specify that the entire user-interface be displayed on each of the first and second display means or to specify that the entire display means be displayed on the first display means and a sub-set of the user-interface, such as a specific application, be displayed on the second display means.

Although implementations relating to providing enhanced display features relative to a notebook computer have been described in language specific to structural features and/or methods, it is to be understood that the subject of the appended claims is not necessarily limited to the specific features or methods described. Rather, the specific features and methods provide examples of implementations for the concepts described above and below.

The invention claimed is:

1. A notebook computer, comprising:
a housing comprising a base having a keyboard positioned thereon; and a lid attached to the base via a first hinge and configured to swing from a transport-position against the keyboard to a user-position away from the keyboard about a first axis;
a first display device positioned on the lid and generally opposing the keyboard; and
a second display device received in the base and configured to deploy from a first storage-position to a second user-position in which the second display device is configured to collectively create a user workspace with the first display device for a user positioned in front of the keyboard and generally opposite the first hinge, wherein the second display device is in the same plane as the first display device when the second display device is deployed to the second-user position, the second display device being rotable via a second hinge that is offset to the rear of the base opposite a position of the user operating the notebook computer, the rotation via the second hinge allowing the second display device to be rotated about a second axis that is independent of the first axis, the second display device being slidable along said second hinge via a channel on the side of the second display device allowing the second display device to be deployed in a presentation position for viewing by another user opposite the user positioned in front of the keyboard.

2. The notebook computer of claim 1, wherein one of the first display device and the second display device is a generally planar liquid crystal display (LCD) device and the other of the first display device and the second display device is not a generally planar LCD device.

3. The notebook computer of claim 1, wherein the notebook computer is configured such that when the second display device is in the first storage-position, the first display device can swing from the transport-position to the user-position for use in a traditional manner.

4. The notebook computer of claim 1 further comprising a sensor means for determining if the second display device is in the first storage position, or the second user-position.

5. The notebook computer of claim 1 further configured to automatically adjust content displayed on the second display device depending upon a sensed position of the second display device.

6. The notebook computer of claim 1, wherein the second display device is slideably received in the base.

\* \* \* \* \*